April 28, 1931.   B. N. BROIDO   1,803,054
METHOD AND APPARATUS FOR HEATING FLUIDS
Filed Jan. 9, 1926   4 Sheets-Sheet 2

BENJAMIN. BROIDO. INVENTOR.

BY *O. V. Thiele*

ATTORNEY.

Patented Apr. 28, 1931

1,803,054

UNITED STATES PATENT OFFICE

BENJAMIN N. BROIDO, OF NEW YORK, N. Y., ASSIGNOR TO THE SUPERHEATER COMPANY, OF NEW YORK, N. Y.

METHOD AND APPARATUS FOR HEATING FLUIDS

Application filed January 9, 1926. Serial No. 80,241.

My invention relates to fluid heating and as it is particularly applicable to the heating of boiler feed water in steam power plants, it will be discussed and described in detail in this connection, although it will be obvious to those skilled in the art that the invention is equally applicable to the heating of fluids other than water, and for purposes other than that herein described.

In the conversion of heat into mechanical energy, as accomplished in modern steam power plants, the highest possible thermodynamic efficiency is represented by the Carnot cycle, that is, the cycle in which the medium which is used to convert heat into energy is first heated isothermally, then expanded adiabatically, then isothermally compressed and finally compressed adiabatically to the temperature and pressure existing at the beginning of the cycle. The Carnot cycle, is however, because of practical considerations, merely a measure of the theoretical maximum efficiency obtainable, and as a matter of practice the majority of power plants at present are operated in accordance with the Rankine cycle, using water as the medium by which heat is converted into power. Operating in accordance with this cycle the medium used is, assuming ideal conditions, raised to the desired temperature and pressure at constant volume; then evaporated and if desired, superheated, at constant pressure; next adiabatically expanded in the prime mover, and finally condensed at constant pressure in the condenser. This cycle, while in common use, has a maximum thermal efficiency which is considerably less than that of the ideal Carnot cycle operating between equal temperature limits, and the efficiency of the Rankine cycle falls progressively below that of the Carnot cycle as the temperature and pressure range through which the medium is worked is increased; even when superheat is added to the medium during the cycle.

Heretofore, the practical consideration of comparative simplicity of equipment has resulted in the operation of power plants in accordance with the Rankine cycle, but the use of superheated steam and the modern tendency towards higher steam temperatures and pressures has resulted in an increase in the difference between the maximum thermal efficiency obtainable with the Rankine cycle and the maximum obtainable efficiency with the ideal Carnot cycle. This, coupled with the rising cost of fuel and other factors entering into the production of power, has necessitated the adoption of cycles other than the Rankine, which, while requiring more complex and expensive equipment for their operation, are capable of producing higher thermal efficiencies.

Among the theoretical cycles available there is the regenerative cycle, and it is in connection with this cycle that my present invention is particularly applicable. In the regenerative cycle, as with the Rankine cycle, the working fluid used is first raised to the desired pressure and temperature by the application of heat at constant volume; then evaporated and if desired, superheated, at constant pressure, and expanded adiabatically in the prime mover. Instead, however, of expanding all of the working fluid in the prime mover down to the pressure at which it is exhausted therefrom into the condenser (as is done in the case of the Rankine cycle), a portion of the fluid is extracted from the prime mover before the expansion is completed, at a temperature and pressure above that existing in the condenser, and this portion of the fluid so extracted is used to supply heat to the fluid which is being heated at constant volume.

In order to obtain the maximum efficiency from this cycle, it is necessary to accomplish the constant volume heating of the fluid in a series of stages, heating progressively at each stage to a temperature approximately that of the heating fluid by means of a portion of the fluid which has been extracted from the prime mover at progressively higher pressures and temperatures. The increase in the thermal efficiency of this cycle over that of the Rankine cycle is due to the fact that the heat necessary to raise the temperature of the heated fluid has been obtained from a portion of the fluid which has already performed mechanical work, rather than from some primary source of heat or from a portion of the heated fluid which has not already performed other work. It can be shown that if the fluid is heated in an infinite number of stages with each stage raising the temperature an infinitesimal amount above that of the preceding stage, and to substantially the temperature of the heating fluid, the efficiency of the cycle can be made equal to that of the ideal Carnot cycle. Practical considerations, however, limit the number of stages which may be employed, but it will be apparent that the greater the number of such stages used, the more efficient will be the cycle.

In the application of the regenerative cycle to power plants, steam is extracted from the turbine or other prime mover of the plant at a number of stages, and the steam so extracted is utilized to heat the boiler feed water, which is passed through a succession of heat exchangers to which the extracted steam is supplied. The heat exchangers used may be either of the closed or open type, but in either case the number of exchangers used, and consequently the possible efficiency of the cycle, is limited by the complication, both as to installation and operation, and the expense involved by the use of many heating stages. The number of stages is further limited because of the space required by a large number of heaters, and in the case of open heaters, a further limiting factor is the necessity for a pump intermediate successive heaters.

It is the general object of my invention, therefore, to provide a method whereby a fluid may be heated to progressively higher temperatures and at progressively higher pressures, in a plurality of stages, and to provide a simple and inexpensive apparatus by which this method may be carried into effect, and as large a number of stages as may be desired used without involving equipment prohibitively complex in installation and operation.

My invention is based upon the well-known hydraulic principle, enunciated as the Bernoulli theorem that, disregarding friction losses, the total head existing in a moving fluid column remains constant, or in other words, that the sum of the static and velocity heads at any point in such a column remains constant. The well-known Venturi tube, in which varying static pressures are obtained in a moving fluid column by means of a conduit having a varying cross-sectional area is based upon this principle, and my invention contemplates the use of apparatus embodying the essential features of a Venturi tube for obtaining the varying fluid pressures necessary to the heating of the fluid by direct contact with a heating fluid simultaneously at a plurality of stages having different pressures.

A further object of my invention is the provision of apparatus of the character described which may be utilized to impart additional kinetic as well as heat energy to the fluid heated, by which means it may be delivered from the apparatus at an increased static pressure.

Other and further objects of my invention will appear in connection with the following detailed description of my invention as applied to the heating of the boiler feed water in a steam power plant operated in accordance with the regenerative cycle, which I have chosen as an illustrative embodiment.

In the accompanying drawings.

Figures 1, 2:
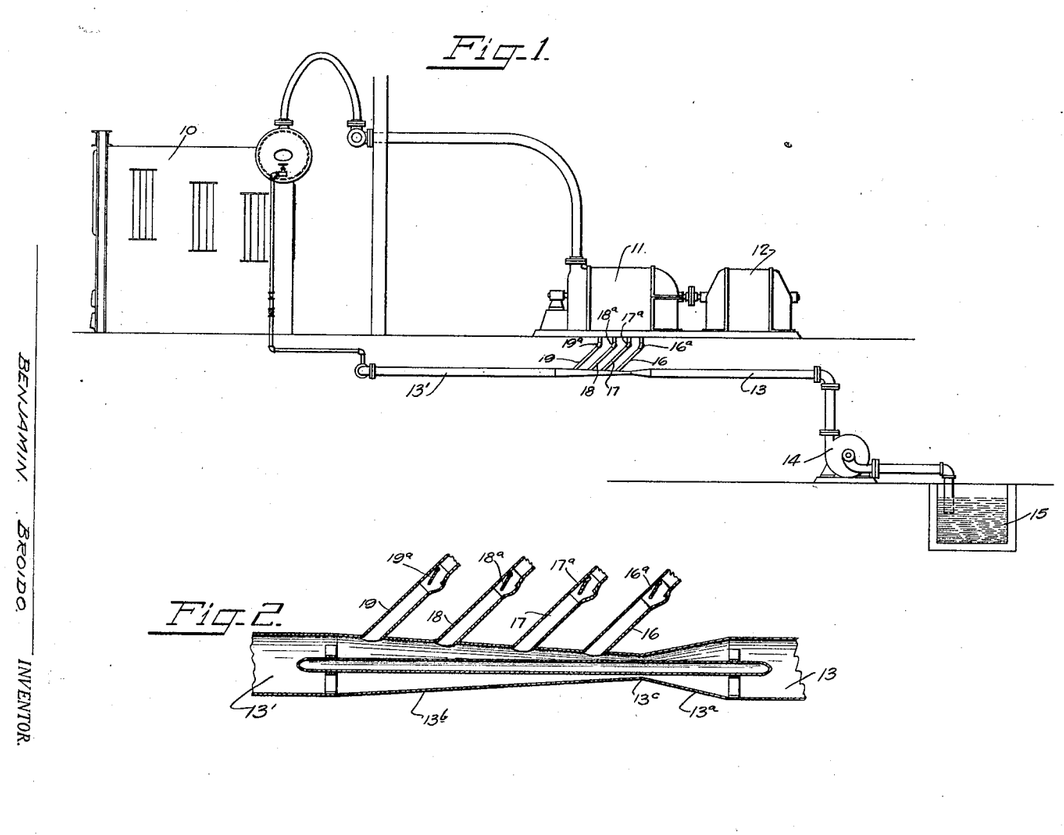
Fig. 1 is a diagrammatic view in elevation of a steam power generating system embodying my invention.
Fig. 2 is a fragmentary section through a purely diagrammatic form of heater illustrating the principle of the invention.

Referring to Fig. 1, the boiler is indicated generally at 10, and the prime mover has been shown as a turbine, indicated at 11, driving an electric generator 12. The specific forms of boiler and prime mover are not material to the present invention, and need not be described herein in detail. The boiler feed water is supplied through the feed pipe 13 from the feed pump 14 which is shown as taking its supply from the usual hotwell 15.

In order to heat the feed water in accordance with the regenerative cycle before it enters the boilers, steam is extracted from the turbine at a plurality of different pressure stages in the latter by means of the conduits 16, 17, 18 and 19, and while I have in the present illustration shown steam extracted at four stages, it is to be understood that the number of stages may be varied in accordance with the requirements of the individual installation.

It is further necessary, in order to conform to the regenerative cycle, that the water be heated in stages, by steam extracted from the turbine at successively higher temperatures and pressures, and in order to more clearly illustrate the manner in which this heating is accomplished by my invention, I have shown in Figs. 1 and 2 an apparatus in purely diagrammatic form, which embodies the fundamental principle of the invention. The feed pipe 13 has placed therein at any suitable location, a Venturi tube composed of two conical sections, 13—a and 13—b, joined at their smaller ends. As the feed water passes through the feed pipe 13 and enters the section 13—a, its velocity is increased and its static pressure reduced as it flows through this section, until at the point 13—c the maximum velocity and minimum pressure is obtained, the actual pressure existing at point 13—c depending upon the ratio between the cross sectional area of the feed pipe at this point, and the cross sectional area of the pipe 13. As the feed water passes point 13—c and enters the conical section 13—b, its velocity is gradually reduced and its pressure correspondingly increased as it passes through this section of increasing sectional area, until the pressure in the section 13′ of the feed pipe again equals that in the pipe 13, except for friction and other losses of like nature. From this it will be seen that a number of different pressures are produced simultaneously in the feed pipe, along the section 13—b, and because of the existence of different pressures within the same conduit, I am enabled to introduce steam at different pressures directly into the conduit, for heating the water progressively as it passes therethrough. In the diagrammatic illustration I have shown the four conduits, 16, 17, 18 and 19, which abstract steam at progressively higher temperatures and pressures from the turbine 11, and these conduits are connected into the Venturi section 13—b at points where the pressure within the latter is substantially equal to the pressure within the turbine where it is tapped by the respective conduits. With this arrangement, steam which has been expanded in the turbine to a comparatively low pressure and temperature is introduced directly into the feed water at a point where its pressure is low, and imparts thereto an initial heating. Steam abstracted from the turbine at a higher temperature and pressure is then introduced into the feed water through conduit 17 at a point where the feed water pressure is correspondingly higher, and the temperature of the feed water is raised to a higher degree. The feed water temperature is then raised to a still higher degree by steam entering through conduits 18 and 19, which take steam from the turbine at progressively higher temperatures and pressures. The conduits 16, 17, 18 and 19 are provided respectively with check valves 16a, 17a, 18a and 19a to prevent the return flow of steam or water from the heater to the turbine in case accident or maladjustment creates a higher pressure in any portion of the heater than exists in the corresponding point in the turbine where steam is extracted.

It will be readily apparent that without undue complication, as many stages of heating as may be desired may be provided with small pressure (and consequently temperature) difference between the stages, and while in the first illustration I have shown four stages, it is to be understood that the number of stages may be varied as the circumstances of the individual installation dictate. As previously pointed out, the greater the number of stages used, the more nearly does the cycle approach in efficiency the ideal Carnot cycle.

Figure 3:
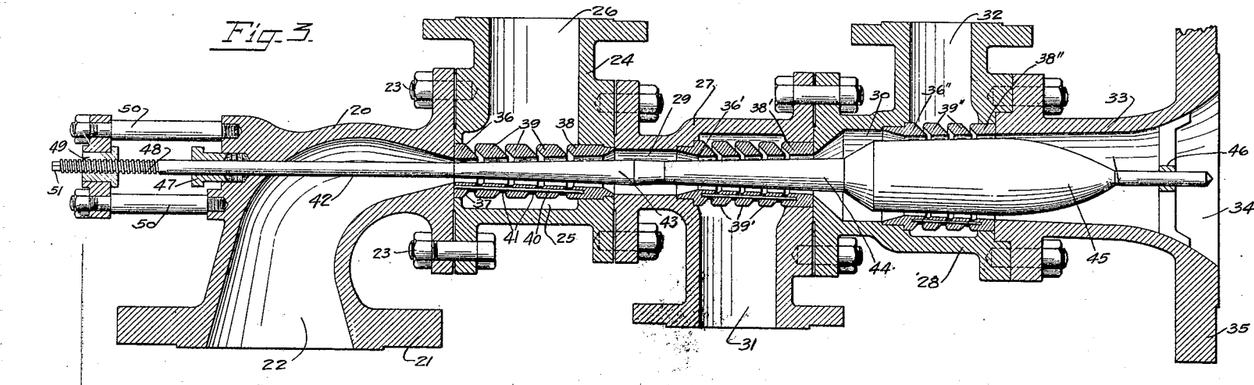
Fig. 3 is a longitudinal section through one form of heater utilizing three stages of heating.
Figure 4:
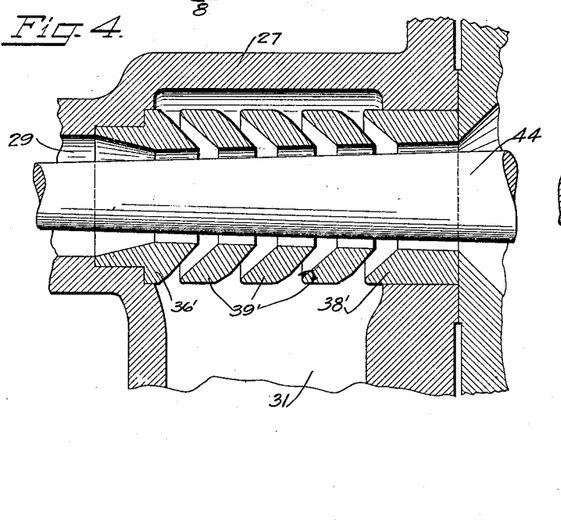
Fig. 4 is a fragmentary view on a larger scale of a portion of the heater shown in Fig. 3.

Referring now to Figs. 3 and 4, I have shown therein a practical form of heater embodying the principle of the heater shown diagrammatically in Fig. 2. In this form, an inlet housing 20, is provided, having a flanged end 21 adapted to be secured to the feed pipe, and having a passage 22 therethrough of diminishing cross sectional area, which serves to increase the velocity and diminish the pressure of the feed water flowing therethrough in the same manner as the section 13—a of the Venturi tube described in connection with Fig. 2. To the flanged discharge end of the housing 20 there is suitably secured, as by bolts 23, a second housing 24, having therein a passage 25 in alignment with the discharge opening in the housing 20 and in communication with a steam inlet passage 26. Similar housings 27 and 28 are provided having central passages 29 and 30 therethrough in communication with steam inlet passages 31 and 32, housing 27 being suitably secured to housing 24, and housing 28 being secured to housing 27. A discharge housing 33, having a flaring passage 34 therethrough is attached to the housing 28 at one end, its opposite end being provided with a flange 35, adapted to be secured to the continuation of the feed pipe.

An annular ring 36, having a bevelled face 37, is fitted in the opening at the end of the passage 25 next to the housing 20, the ring being provided with a tapered bore, the small diameter end of which is the same size as and registers with the discharge opening in the housing 20. At the opposite end of the passage 25, a similar ring 38 is fitted in the housing 26. Intermediate the rings 36 and 38, a series of spaced rings 39 are provided, the spaces between the several rings forming a plurality of annular ports providing communication between the steam inlet passage 26 and the inner bore of the rings, opening into the water passage 22. The rings 39 may be suitably spaced and secured in place by means of rods 40 (one only being shown in Fig. 3) passing therethrough, the ends of the rods being imbedded in the fixed rings 36 and 38, and with the desired spacing of the rings secured by means of washers 41 around the rods 40, and between the several rings. Similar end rings 36' and 38' with intermediate rings 39', are secured within the housing 27, and a like set of rings 36'', 38'' and 39'', are secured in the housing 28.

Each of the three sets of rings provide a central passage of gradually increasing cross sectional area in the direction of flow through the heater, and there is provided centrally of these passages a plunger 42, having tapered sections 43, 44, and 45, respectively located in the passages formed through the center of the sets of rings in the housings 24, 27 and 28. The plunger 42 is slidably supported at one end in a suitable bearing formed in a bracket 46 located in the outlet housing 33, and at its other end passes through the housing 20, a suitable stuffing box and gland 47 being provided to prevent leakage at this point. The extended end of the plunger 42 is threaded, as at 48, and passes through a fixed threaded block 49, which is suitably secured to the housing 20, as by bolts 50. A squared end, 51, is provided on the end of the plunger 42 for rotating the latter, whereby longitudinal adjustment of the plunger may be obtained by means of the threaded end 48 passing through block 49.

As may be seen from Fig. 3, the left hand ends of housings 27 and 28 are extended beyond rings 36' and 36'' to form portions of passages 29 and 30 having larger diameters than the diameters of the sets of rings between which they are situated. The purpose of these enlarged passages will appear later.

The operation of the device is as follows: Feed water under pressure sufficient to force it into the boiler enters the heater through the tapered passage 22, and in flowing therethrough a portion of its pressure energy is converted into energy of velocity and the static pressure of the water correspondingly reduced, so that it is discharge at low pressure and high velocity into the annular passage formed between the tapered portion 43 of plunger 42, and the annular rings 36, 38 and 39 surrounding the plunger. Steam at a pressure slightly higher than the water pressure at this point is admitted to the passage 26 and flows through the nozzle openings formed between the rings to mingle with and be condensed by the water flowing therethrough.

The portion 43 of the plunger is tapered with respect to the bore of the surrounding rings so that the annular passage therebetween is formed with a slightly increasing sectional area from inlet to outlet. This is done in order that the velocity and pressure of the water column passing therethrough will remain constant in spite of its increased volume caused by the condensation of steam entering by way of the ports or nozzles formed between the several rings.

The action in each of the succeeding chambers is the same as that just described except that in each succeeding chamber the annular passage between plunger and ring through which the water flows, has progressively a larger sectional area, so that the water in each chamber passes therethrough at lower velocity and higher static pressure than that existing in the preceding chamber. In each succeeding chamber steam is admitted at the higher pressure (and consequently higher temperature) corresponding to the water pressure existing in that chamber, and in this manner the water flowing through the heater is progressively heated by higher temperatured steam until the desired water temperature is reached, and it is thereafter discharged through a flaring discharge section, in which the velocity of the water is reduced, and the static pressure restored to a point above boiler pressure for discharge into the boiler.

The plunger 42 has three main functions. One is to increase the surface area of the water at the point where steam is injected, by forming an annular column of water passing through the nozzle. A second function is to provide means whereby variations in the quantity of flow through the heater may be compensated for by longitudinal adjustment of the plunger, and the desired water pressure within the heater maintained. The third function of the plunger is to provide means whereby, with a constant flow through the heater, the water pressures in the several stages may be varied as desired by longitudinal adjustment of the plunger. The desired regulation is secured by the plunger adjustment because of the change in the sectional area of the annular water column resulting from a change in position of the tapered plunger with respect to the rings surrounding it, and the consequent change in velocity and pressure of the water column. It may not be necessary to provide an adjustable plunger, as for example, where the steam and water rates and pressures are comparatively constant, and in such cases the plunger may be fixed, with the taper omitted from both plunger and rings.

In order to obtain the maximum efficiency from the regenerative cycle, the feed water should in each stage be heated as nearly as possible to its evaporating temperature at the pressure existing in that stage, and for this reason the temperature head between the steam and the water leaving the stage is comparatively slight. Because of the slight temperature head, an appreciable time may be required for the steam to be condensed by the water, and because of the rapidity of flow through the heater, particularly in the low pressure stages, entrained and uncondensed steam may be carried beyond the stage where it was injected. In order to assure full condensation of all steam entering each stage, I provide means whereby the water pressure, and consequently its evaporating temperature, is substantially raised before the water enters the next heating stage. I accomplish this by providing the enlarged passages 29 and 30 between the stages, into which the water from the preceding stage is discharged. In these enlarged passages the static pressure is raised upon the reduction of velocity of the flow therethrough, and any uncondensed steam in the water is given an opportunity to be condensed before the pressure is again reduced and the water discharged into the succeeding chamber.

As will be apparent from the foregoing description, the practical form of heater differs from the theoretical form illustrated in Fig. 2, in that the water flow through the actual heating stages is at constant pressure and velocity. This difference is in no way a departure from the underlying principle of the invention, as the water pressure is raised between stages by the conversion of velocity energy into pressure energy. The constant pressure flow in the various stages is necessitated by the fact that a considerable area of contact between steam and water must be presented in order to condense sufficient steam in each stage to heat the water to the desired degree, and in the form shown in Fig. 3, the number of nozzles in each stage is to be taken purely as illustrative, as the number necessary may vary widely with differences in pressures and temperatures encountered in different individual installations.

Figure 5:
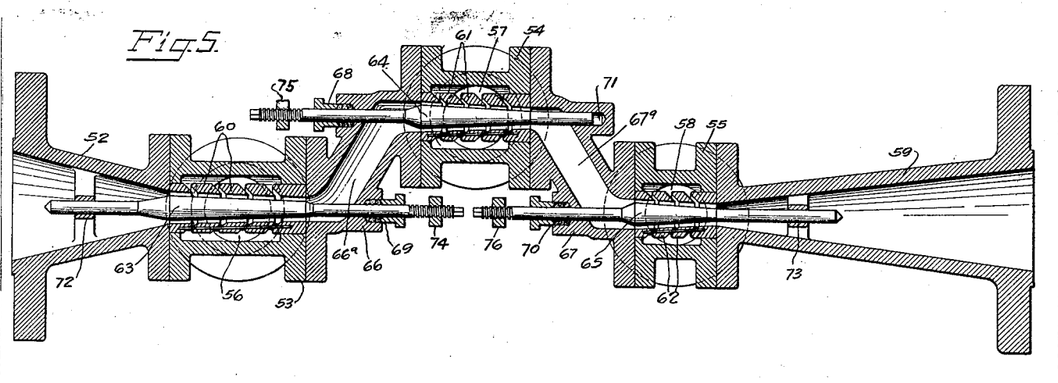
Fig. 5 is a section similar to that of Fig. 3 of a modified form of heater.
Figure 6:
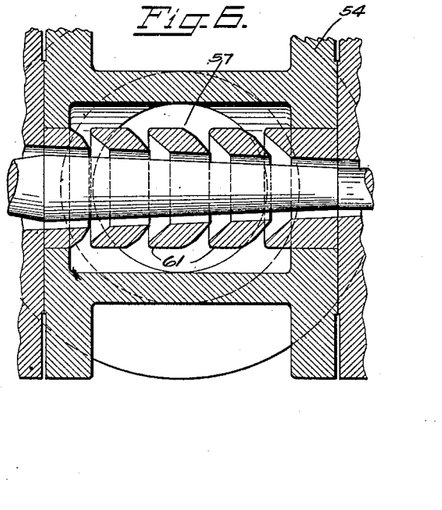
Fig. 6 is an enlarged fragmentary section of a portion of Fig. 5.

In the form shown in Fig. 3, the proportions of the water and steam passages are such that the only effect of the steam condensed is to heat the water passing therethrough, but it will be obvious that, if desired, a certain injecting effect, which will serve to add kinetic as well as heat energy to the water, may be secured by properly proportioning the water passages and the steam nozzle areas. In Figs. 5 and 6, I have shown a modified form of three-stage heater, designed to impart additional pressure to the feed water in addition to heating it. With this arrangement the feed water pump may be operated at a pressure lower than boiler pressure, the additional pressure necessary to force the water into the boiler being imparted to the feed water by the heater.

This form is particularly applicable to use in supplying feed water to modern boilers of the superpressure type, where pressures of the order of a thousand pounds per square inch, or higher, are encountered. By the use of the injecting type of heater, a feed pump operating at a pressure considerably below boiler pressure may be employed, which in itself is advantageous, but the main advantage derived is the avoidance of excessive water velocities through the heater, which would be required to secure low pressures in the heater, if the pump operated at boiler pressure.

The construction of this form is, in general, the same as that previously described, the heater comprising a tapered inlet housing 52, intermediate housings 53, 54 and 55, having steam inlets 56, 57 and 58 respectively, and a tapered outlet housing 59, the flaring discharge end of which serves to bring the water column passing therethrough to the desired static pressure by a reduction in the velocity of flow. In each of the housings 53, 54 and 55, there are secured in a manner similar to that described in connection with Fig. 3, sets of annular nozzle-forming rings 60, 61 and 62, surrounding the respective tapered plungers 63, 64 and 65. It is to be particularly noted, however, that while in this case I have shown the taper of the several plungers as opposite that of the form shown in Fig. 3, the direction of the taper is immaterial, as in either case the cross-sectional area of the annular space between the respective plungers and their surrounding rings is determined not by the direction of taper, but by the clearance provided between any plunger and the several rings which surround it.

The housing 54 is separated from housings 53 and 55 by two intermediate housing members 66 and 67. These latter members serve to offset the housing 54 from the axial line of housings 53 and 55, the member 66 being provided with stuffing boxes 68 and 69, through which the ends of plungers 63 and 64 pass, while member 67 is provided with a stuffing box 70, through which plunger 65 passes, and a recess 71 serving to support one end of plunger 64. Members 66 and 67 also provide passages 66a and 67a intermediate the several heating chambers and having cross sectional areas larger than the water areas in the chambers. These enlarged passages correspond to the chambers 29 and 30 described in connection with Fig. 3, and serve the same purpose. Brackets 72 and 73, located respectively in the housings 52 and 59, serve to slidably support the interior ends of plungers 63 and 65. Plungers 63, 64 and 65 are longitudinally adjustable by means of threaded ends engaging, respectively, the fixed blocks 74, 75, and 76, which are fixedly attached to their respective housings. By this arrangement of the several elements, the sectional area of the annular space between plunger and ring in any of the heating chambers may be varied independently of the other chambers, the object of this independent adjustment appearing more fully hereinafter.

Where, as in this case, an injecting action is desired, the feed pump or other forcing means delivers water to the inlet end of member 52 at a pressure considerably lower than the final discharge pressure at which the water is delivered from the outlet member 59. Because of the low initial pressure, a smaller reduction in area and increase in velocity is required to bring the water down to the pressure of the first heating stage than is the case when a high initial water pressure is required. As will be obvious from an inspection of Fig. 5, the reduction in sectional area between the inlet and discharge ends of member 52 is much less than that in the corresponding member 20 of the form shown in Fig. 3. For this reason, if the same quantity of flow be assumed in the case of both forms, the velocity of flow through the first stage of the form shown in Fig. 5 will be much lower than the velocity of flow through the first stage of the form shown in Fig. 3. Assuming equal steam and water temperatures in the first stage of the two forms, the rate of condensation of steam in the two will be approximately the same. From this it follows that equal steam jet velocity may be obtained with steam passages and nozzles of approximately the same area. In the case of the non-injecting type (Fig. 3), the steam and water velocities are made substantially equal, so that the steam is condensed by a column of water moving at a velocity as high as that of the steam itself, and no kinetic energy is added to the water column by the condensation of the steam.

On the other hand, in the form shown in Fig. 5, the velocity of the water through the heating stage is materially lower than the velocity of the steam through the nozzles with the result that when the steam is condensed it adds kinetic as well as heat energy to the water. It will be apparent, however, that the relative velocities of the steam and water at the point of contact may be varied by a number of different expedients, as, for example, by changing the form of the steam nozzles, which may be designed to produce either an acceleration or deceleration in the velocity of the steam passing therethrough.

From the foregoing it will be obvious that injecting or non-injecting action of any heating stage is determined by the relative water and steam velocities in that stage, and that either action can be obtained by variation in the adjustment of the tapered plunger with respect to the surrounding rings. For example, in the type of heater shown in Fig. 5, which is designed to operate with an injecting action, movement of the plunger 63 to the right would operate to cut down the sectional area and increase the velocity of the water column passing through the stage, and if such adjustment were made to a point which would increase the water velocity to that of the steam, the injecting action could be substantially eliminated.

Conversely, in the form shown in Fig. 3, if the plunger is moved to the right, the sectional area of the water column is increased and the result will be a decrease in the velocity of the water and an increase in its static pressure. The decrease in the water velocity will cause an injecting action to take place in this stage, but it is to be noted in this connection that a higher steam pressure would be necessary if such adjustment were made, because of the increase in static pressure of the water accompanying its decrease in velocity.

The injecting form illustrated in Fig. 5 has been shown with separately adjustable plungers, but it is to be understood that this construction is equally applicable to both forms of heater. With the separately adjustable plungers, it is possible to secure a finer degree of regulation than is possible with the single plunger, and this may be advantageous in order to compensate for pressure and other fluctuations and irregularities encountered in practice.

In this connection it is to be noted that it is preferable to confine the service of a heater to the particular duty for which it was primarily designed. The reason for this lies in the fact that, as previously pointed out, the sectional area of the annular water space of any stage gradually increases toward the discharge end to accommodate the added volume caused by steam condensation. The increase in sectional area of this annular space is secured by making the taper of the plunger slightly different from the taper of the bore formed by the surrounding annular rings, and it will be obvious that because of this variation in taper, an adjustment of the plunger will not produce a proportionate reduction or enlargement of the sectional area of the annular passage throughout the length of the chamber. This disproportionate adjustment will produce a slight difference in the pressure of the water column passing through the chamber between the inlet and discharge ends thereof, which in cases of minor adjustment will have a negligible effect, but which in the case of an adjustment great enough to change the action from non-injecting to injecting, or vice versa, may cause an undesirably large variation of pressure in the water column within the chamber.

Figure 7:
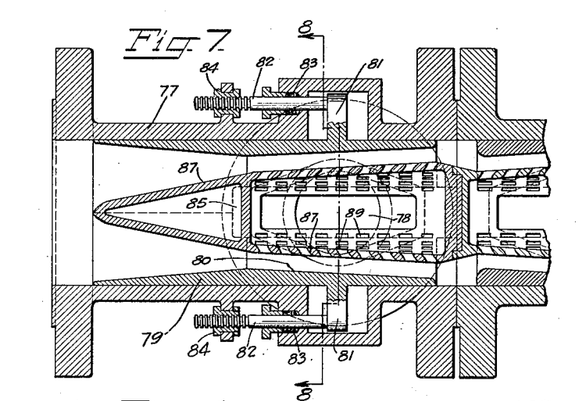
Fig. 7 is a fragmentary longitudinal section taken through a third form of heater.
Figure 8:
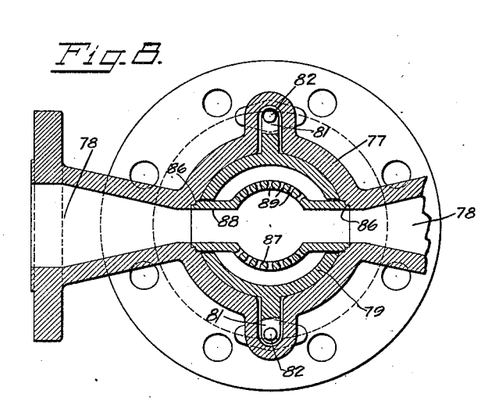
Fig. 8 is a transverse section taken on a line 8—8 of Fig. 7.

In Figs. 7 and 8, I have shown one stage of a heater similar in general construction to the forms shown in Figs. 3 and 5, different, however, from the latter in that steam is admitted to the annular water column from the inner core rather than from the outer circumference thereof. In this form a housing 77 is provided, having a cylindrical bore therethrough, with which there communicate the steam inlets 78. A cylindrical sleeve 79, having a tapered face 80, is slidably mounted within the bore of the housing 77 and is held in adjustably fixed position by means of ears 81, positioned in suitable recesses in housing 77, and adjusting rods 82. The latter pass through suitable stuffing boxes 83 in the housing 77 and are threaded at their ends to engage the fixed threaded adjusting blocks 84. The sleeve 79 is provided with longitudinal slots 85 therethrough, opposite the steam inlet openings 78, and the housing 77 is shouldered as at 86 to fixedly support a hollow conical member 87, the interior of which is in communication with the steam inlets 78 by means of the hollow supporting arms 88. The conical member 87 is provided with a plurality of ports 89, which serve as nozzles for the admission of steam to the water column passing through the heater. Regulation of the water velocity and pressure is secured by longitudinal movement of the tapered sleeve 79, which acts to vary the sectional area of the annular space formed between the sleeve and the inner conical member 87.

In cases where one or more of the heating stages operate in partial vacuum or at very low pressure, the volume of steam to be handled is very large. This necessitates a large area of contact between steam and water in order to secure sufficient steam condensation, and it will be obvious that in order to avoid unduly lengthening the heating stage, the inside and outside nozzel forms which I have illustrated may be readily combined in each stage to give the increased nozzle area desired.

Figures 9, 10:
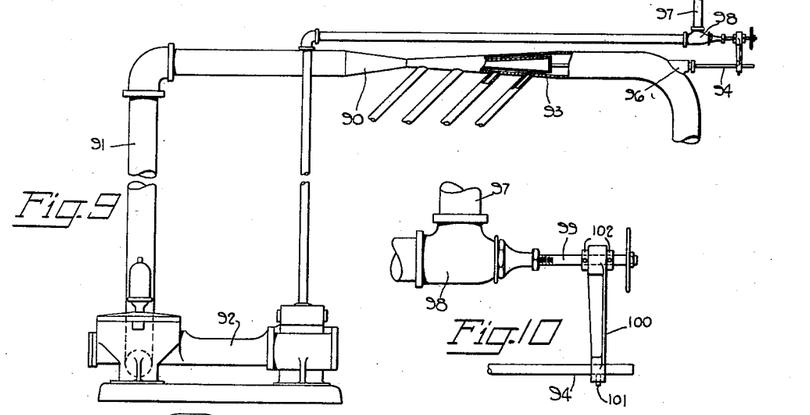
Fig. 9 is an elevation showing the heater in diagrammatic form with one form of pressure regulating means attached thereto.
Fig. 10 is a detail on a larger scale of the regulating mechanism.

In Figs. 9 and 10 I have shown in diagrammatic form an apparatus for automatically adjusting the flow area through the heater in accordance with the rate at which water is being forced therethrough. It will be obvious from the preceding description of the heater that to maintain a given water velocity and pressure within the heater different free flow areas for water therethrough will be required with different rates of water flow. If the water flow through the heater is increased, a larger free area through the heater must be provided in order to maintain a given velocity, and if the quantity of water passing through the heater is diminished the free area therethrough must be correspondingly diminished if the velocity is to be maintained constant. In order to effect this regulation automatically I have shown in Fig. 9 a form of apparatus in which the free flow area through the heater is automatically varied with variations in the amount of motive fluid supplied to the pump or other motor which forces water through the heater. In the figure the heater is diagrammatically represented at 90 and is supplied through feed pipe 91 by the feed pump 92 which in this case is shown as the ordinary duplex reciprocating form. The inner plunger 93, which by longitudinal movement effects a variation in the free flow area through the heater, is provided with an extended control rod 94 which passes through the heater discharge pipe 95 by way of the stuffing box 96. Pump 92 is supplied with live steam through pipe 97 and the steam supply to the pump, which governs the quantity of water pumped, is controlled by valve 98 having a valve stem 99 of the type moving into or out of the valve housing as the valve is closed or opened. The valve 98 is placed so that stem 99 may be connected to the extended rod 94 by a rigid cross member 100 which is fixedly secured to rod 94, as by the set screw 101. Preferably the valve stem 99 passes through a suitable opening in one end of the member 100 and longitudinal motion of the member 100 along the valve stem 99 is prevented by means of collars 102 fixedly attached to the valve stem by means of set screws or other suitable means. As will be apparent from an inspection of the drawing, the size of the free flow area through the heater will be dependent upon the position of the pump control valve 98. With the valve closed the plunger 93 in the heater will be in its extreme left hand position, with the free passage through the heater reduced to a minimum. As the valve is opened the plunger 93 is moved to the right a distance proportional to the opening of the valve, so that as the quantity of water pumped through the heater increases its velocity through the heater is maintained substantially constant by virtue of the increased flow area automatically provided through the heater.

It will be equally obvious that the converse is true—that is, as the flow through the heater is reduced by a partial or entire closing of the valve 98 the free flow area through the heater will be correspondingly reduced and the velocity within the heater maintained substantially constant.

Figure 11:
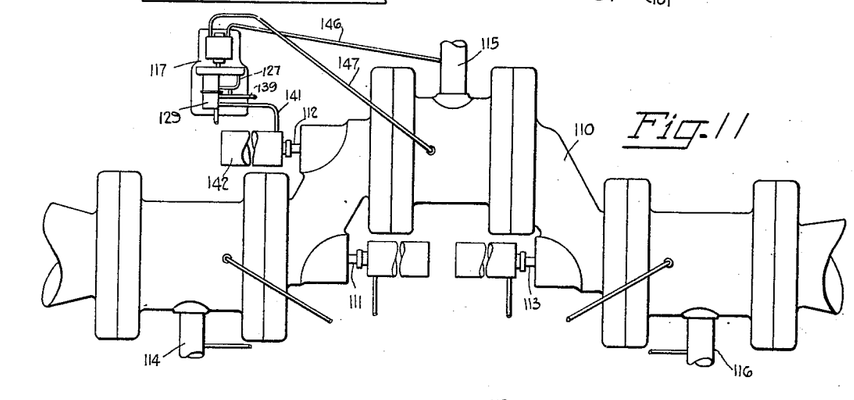
Fig. 11 is an elevation of the form of heater shown in Fig. 5, to which another form of regulating means has been applied

In Fig. 11 I have shown a form of heater such as is illustrated in Fig. 5 equipped with automatic regulating means designed to maintain the proper water velocity and pressure in all the stages of the heater under varying pressure and velocity conditions both of the water passing through the heater and of the heating steam admitted thereto. This regulation is accomplished by means which maintain a constant differential pressure between the heating steam admitted to any stage and the water flowing through that stage. Referring now to Fig. 11, 110 indicates generally a three-stage heater having separate regulating plungers 111, 112 and 113 extending through the casing as previously described in connection with Fig. 5. Steam is admitted to the several stages through the inlet pipes 114, 115 and 116 and the proper water pressure is maintained in each of the several stages by means of a differential pressure regulator which operates to vary the position of the regulating plunger. The second stage plunger 112 is shown governed by the regulator 117, and for the sake of simplicity, the duplicate regulators used to control the first and last stages in the heater have been shown only in part.

Figure 12:
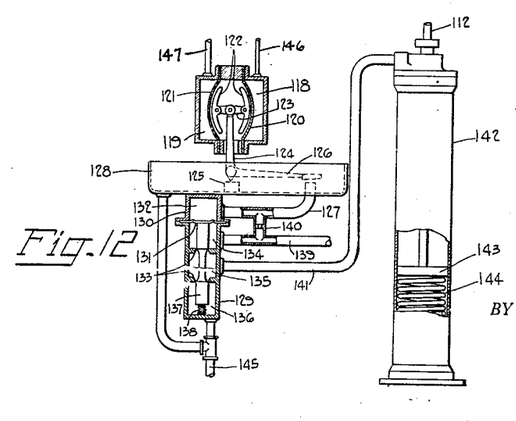
Fig. 12 is an elevation partly in section and on a larger scale illustrating the details of construction of the regulating means.

In Fig. 12 I have shown in detail to a larger scale a known form of regulating mechanism capable of effecting the desired results. This mechanism forms no part of the present invention but is chosen solely for illustrative purposes and it is to be understood that any equivalent mechanism may be substituted for the one shown. As illustrated in Fig. 12, the regulating mechanism comprises twin pressure chambers 118 and 119 formed by suitable housings having their adjacent side walls formed by the flexible diaphragms 120 and 121. These diaphragms are spaced apart and bear against shoes 122 which are held in spaced relation at their mid-point by the link 123, pivotally connected at its center to one end of a bell crank arm 124 which passes through an opening in the housing forming the chambers 118 and 119. The crank arm 124 is supported on a knife edge 125 and the horizontal arm 126 of the bell crank terminates in a disc disposed directly over the vertical outlet of a pipe 127 opening into the vessel 128.

A cylinder 129 is provided, having a cap 130 attached thereto by means of a suitable flanged connection with a flexible diaphragm 131 disposed between the flanges so that a chamber 132 is formed in said cap from which the pipe 127 leads to the vessel 128. Cylinder 129 is provided with intermediate partitions 133, having openings centrally therethrough, which divide the cylinder into three chambers 134, 135 and 136. A plunger 137 is provided having end portions located in chambers 134 and 136, of such diameter as to form a sliding fit in the openings in the partitions 133. The central portion of plunger 137 is of reduced diameter and extends through the chamber 135 between the partitions 133. The plunger is normally held with the portion of reduced diameter exactly centered in the chamber 135 by means of the spring 138 urging it against the diaphragm 131. A pipe 139 leading from some source of constant pressure fluid supply is connected into the chamber 134 and is provided with a branch leading into pipe 127 through a restriction 140. A drain 145 is provided leading from the vessel 128 and from the chamber 136 in cylinder 129. A pipe 141 leads from the chamber 135 to one end of an operating cylinder 142 in which there is located the piston 143, connected to the heater plunger 112. Piston 143 is urged toward the end of the cylinder to which pipe 141 leads by a coiled spring 144.

As applied to the heater, the chamber 118 is connected by pipe 146 into the steam inlet pipe 115, and chamber 119 is connected by pipe 147 into the water space of the corresponding stage. The operation of the device is as follows: A constant stream of fluid, for example, water, flows into the regulator under constant pressure through the pipe 139, entering the chamber 134 on one side of the diaphragm 131, and also chamber 132 on the opposite side by way of the restriction 140 and pipe 127. A constant overflow is maintained from the open end of pipe 127 into vessel 128, the overflow passing from the regulator through drain 145. The pressure maintained in pipe 127 and chamber 132 above the diaphragm varies in accordance with the distance of the end of the bell crank 126 from the end of pipe 127, falling as the bell crank rises and rising as the bell crank falls and restricts the overflow opening in pipe 127. The movement of the bell crank is determined by the difference in pressure existing in chambers 118 and 119, which measures the difference in pressure existing between the water column passing through the heater and the heating steam admitted thereto. If pipe 141 and cylinder 142 be filled with fluid under pressure sufficient to hold piston 143 in the position shown against the pressure of spring 144, it will be apparent that in the position shown in the figure the piston will remain in this position, as the plunger 137, closing the opening in partitions 133, prevents the release of fluid from pipe 141 through chamber 135 into chamber 136 and also prevents the passage of fluid from chamber 134 into chamber 135. This is the position taken by the apparatus when the proper difference in pressure exists between the water column passing through the heater and the steam admitted thereto. If now, however, the pressure in chamber 118 be increased over that in 119 by a rise in steam pressure, or a fall in water pressure, the bell crank arm 126 will be lifted and will operate to decrease the pressure in chamber 132 by enlarging the overflow opening from pipe 127. This decrease in pressure will not be immediately transmitted to chamber 134 because of the restriction 140 through which pipes 127 and 139 are connected. When the pressure in chamber 132 falls, spring 138 acts to raise the plunger 137 against the diaphragm 131 and the end of the reduced portion of the plunger passes the upper partition 133 so that chambers 134 and 135 are brought into communication. This serves to admit the fluid pressure from pipe 139 through chambers 134, 135 and pipe 141 to the operating cylinder 142, to actuate piston 143 and move the heater plunger 112 to the left as shown in Fig. 11. It is to be noted that during this movement of the plunger 137 communication between chambers 135 and 136 is prevented by the enlarged lower end of the plunger. By reference to Fig. 5, it will be seen that movement of the plunger to the left will increase the free flow area through the heating stage, resulting in a decreased water velocity and an increased static water pressure, which will operate to compensate for the rise in steam pressure or fall in water pressure, and restore the differential pressure desired. In the event that pressure in chamber 118 falls with respect to that of chamber 119 because of falling steam pressure or rising water pressure, the overflow from pipe 127 is restricted by the downward movement of bell crank arm 126. This causes an increase in pressure in chamber 132, which, acting on diaphragm 131, forces plunger 137 downwardly against the pressure of spring 138. Downward movement of plunger 137 from the position shown in the figure opens the operating cylinder 142 to drain 145 by way of pipe 141, chamber 135 and chamber 136, the two chambers being placed in communication by the passage of the lower end of plunger 137 from the aperture in the lower partition 133. It will be obvious that upon release of pressure in cylinder 142 the piston 143 will be moved outwardly by the spring 144 and the heater plunger 112 correspondingly moved to the right. This movement, by restricting the free flow area, and increasing the water velocity through the heating stage, reduces the static water pressure therein, and restores the desired differential between the steam and water pressures in the heater.

It will be readily apparent that each of the regulating means I have shown may be applied with equal facility to different forms of heaters, that is, a regulator of the differential pressure type may be applied to a form of heater such as is shown in Fig. 3, having only a single regulating plunger, or a throttle type of regulator may be applied to the form of heater shown in Fig. 5, so that the throttle valve steam actuates a plurality of separate regulating plungers.

It may be readily understood from the foregoing description of the several illustrative embodiments shown that my invention may be embodied in apparatus having widely differing physical forms susceptible to regulation in various manners and its scope is not to be limited to the specific form shown but only by the scope of the appended claims.

I claim:

1. The method of heating a fluid which consists in forcing it under an initial pressure through a closed conduit in a substantially continuously flowing stream and, while it is passing through said conduit, reducing this pressure by utilizing the initial pressure of the fluid to convert a portion of the pressure energy of the fluid into energy of velocity, mingling the fluid to be heated with a heating medium while in the state of reduced pressure, and thereafter increasing the pressure of the heated fluid by reconverting energy of velocity into pressure energy.

2. The method of heating a fluid which consists in forcing it under an initial pressure through a conduit in a substantially continuously flowing stream and, while it is passing through said conduit, reducing this pressure by utilizing the initial pressure of the fluid to convert a portion of the pressure energy of the fluid into energy of velocity, controlling the amount of pressure reduction to produce a predetermined reduced pressure, mingling the fluid to be heated with a heating medium while in the state of reduced pressure, and thereafter increasing the pressure of the heated fluid by reconverting energy of velocity into pressure energy.

3. The method of heating a liquid which consists in forcing it under an initial pressure through a closed conduit in a substantially continuously flowing stream and, while it is passing through said conduit, reducing this pressure by utilizing the initial pressure of the fluid to convert a portion of the pressure energy of the fluid into energy of velocity, condensing a vapor of the same liquid with the liquid to be heated while in the state of reduced pressure, and thereafter increasing the pressure of the heated liquid by reconverting energy of velocity into pressure energy.

4. The method of heating a liquid which consists in forcing it under an initial pressure through a closed conduit in a substantially continuously flowing stream and, while it is passing through said conduit, reducing this pressure by utilizing the initial pressure of the fluid to convert a portion of the pressure energy of the fluid into energy of velocity, controlling the amount of pressure reduction to produce a predetermined reduced pressure, condensing a vapor of the same liquid with the liquid to be heated while in the state of reduced pressure, and thereafter increasing the pressure of the heated liquid by reconverting energy of velocity into pressure energy.

5. The method of heating water which consists in forcing it under an initial pressure through a closed conduit in a substantially continuously flowing stream and, while it is passing through said conduit, reducing this pressure by utilizing the initial pressure of the fluid to convert a portion of the pressure energy of the fluid into energy of velocity, bringing the water while in the state of reduced pressure into direct contact with steam at a slightly higher pressure, whereby the latter is condensed, and thereafter increasing the pressure of the water by reconverting energy of velocity into pressure energy.

6. The method of heating water which consists in forcing it under an initial pressure through a conduit in a substantially continuously flowing stream and, while it is passing through said conduit, reducing this pressure by utilizing the initial pressure of the fluid to convert a portion of the pressure energy of the fluid into energy of velocity, bringing the water while in the state of reduced pressure into direct contact with steam at a slightly higher pressure, whereby the latter is condensed, controlling the amount of pressure reduction to produce a predetermined pressure difference between said steam and water, and thereafter increasing the pressure of the water by reconverting energy of velocity into pressure energy.

7. The method of heating water which consists in forcing it under an initial pressure through a closed conduit in a substantially continuously flowing stream and, while it is passing through said conduit, reducing this pressure by utilizing the initial pressure of the fluid to convert a portion of the pressure energy of the fluid into energy of velocity, condensing with the water while in the state of reduced pressure a quantity of steam sufficient to heat the water substantially to its evaporating temperature at the reduced pressure, and thereafter increasing the pressure of the water by reconverting energy of velocity into pressure energy.

8. The method of heating a liquid which consists in forcing it under an initial pressure through a closed conduit in a substantially continuously flowing stream and, while it is passing through said conduit, reducing this pressure by utilizing the initial pressure of the fluid to convert a portion of the pressure energy of the fluid into energy of velocity, increasing its temperature and velocity while in the state of reduced pressure by condensing with it a vapor of the same liquid, and thereafter increasing the pressure of the heated liquid by reconverting energy of velocity into pressure energy.

9. The method of heating a liquid which consists in forcing it under an initial pressure through a conduit in a substantially continuously flowing stream and, while it is passing through said conduit, reducing this pressure by utilizing the initial pressure of the fluid to convert a portion of the pressure energy of the fluid into energy of velocity, controlling the amount of pressure reduction to produce a predetermined reduced pressure, increasing its temperature and velocity while in the state of reduced pressure by condensing with it a vapor of the same liquid, and thereafter increasing the pressure of the heated liquid by reconverting energy of velocity into pressure energy.

10. The method of heating water which consists in forcing it under an initial pressure through a closed conduit in a substantially continuously flowing stream and while it is passing through said conduit, reducing this pressure by utilizing the initial pressure of the fluid to convert a portion of the pressure energy of the fluid into energy of velocity, heating the water substantially to its evaporating temperature and increasing its velocity while in the state of reduced pressure, and thereafter increasing the pressure of the heated water by reconverting energy of velocity into pressure energy.

11. The method of heating a fluid which consists in forcing it under an initial pressure through a closed conduit in a substantially continuously flowing stream and while it is passing through said conduit, reducing this pressure by utilizing the initial pressure of the fluid to convert a portion of the pressure energy of the fluid into energy of velocity, increasing the static pressure of the fluid by reconverting energy of velocity into pressure energy, and mingling a heating medium with the fluid at a plurality of points of progressively higher static pressure.

12. The method of heating a fluid which consists in forcing it under an initial pressure through a conduit in a substantially continuously flowing stream and, while it is passing through said conduit, reducing this pressure by utilizing the initial pressure of the fluid to convert a portion of the pressure energy of the fluid into energy of velocity, increasing the static pressure of the fluid by reconverting energy of velocity into pressure energy, mingling a heating medium with the fluid at a plurality of points of progressively higher static pressure, and controlling the amount of pressure reduction to produce predetermined fluid pressures at said points.

13. The method of heating a liquid which consists in forcing it under an initial pressure through a closed conduit in a substantially continuously flowing stream and while it is passing through said conduit reducing this pressure by utilizing the initial pressure of the fluid to convert a portion of the pressure energy of the fluid into energy of velocity, increasing the static pressure of the liquid by reconverting energy of velocity into pressure energy and condensing a vapor of the same liquid with the liquid to be heated at a plurality of points of progressively higher static pressure.

14. The method of heating water which consists in forcing it under an initial pressure through a conduit in a substantially continuously flowing stream and, while it is passing through said conduit, reducing this pressure by utilizing the initial pressure of the fluid to convert a portion of the pressure energy of the fluid into energy of velocity, increasing the static pressure of the water by reconverting energy of velocity into pressure energy, condensing at a plurality of points of progressively higher static water pressure steam at a pressure slightly higher than the water pressure at the respective points of condensation, and controlling the amount of pressure reduction to produce a predetermined pressure difference between the steam and water at said points.

15. The method of heating water which consists in forcing it under an initial pressure through a closed conduit in a substantially continuously flowing stream and, while it is passing through said conduit, reducing this pressure by utilizing the initial pressure of the fluid to convert a portion of the pressure energy of the fluid into energy of velocity, increasing the static pressure of the water by reconverting energy of velocity into pressure energy, and at a plurality of points of progressively higher static water pressure condensing with the water a sufficient quantity of steam to raise the water substantially to its evaporating temperature at the respective points of condensation.

16. The method of heating water which consists in forcing it continuously under pressure through an initial nozzle which converts pressure energy into energy of velocity, whereby the static pressure of the water is reduced, passing the water discharged from said nozzle at substantially constant pressure through a combining chamber and there heating it by condensing with it steam which is introduced into said chamber at a plurality of points distributed along the length of the chamber, increasing the pressure of the water by discharging it from said combining chamber through a passage which reconverts a portion of the energy of velocity into pressure energy, passing the water discharged from said passage at substantially constant pressure through a second combining chamber, and there heating it further by condensing with it steam introduced into said second chamber at a plurality of points distributed along the length of the chamber at a pressure greater than the steam pressure in the first chamber, and thereafter heating the water in like manner at progressively higher pressures until the desired temperature is attained.

17. The method of heating water which consists in forcing it continuously under pressure through an initial nozzle which converts pressure energy into energy of velocity, whereby the static pressure of the water is reduced, passing the water discharged from said nozzle at substantially constant pressure through a combining chamber and there heating it by condensing with it steam which is introduced into said chamber, increasing the pressure of the water by discharging it from said combining chamber through a passage which reconverts a portion of the energy of velocity into pressure energy, passing the water discharged from said passage at substantially constant pressure through a second combining chamber, and there heating it further by condensing with it steam introduced into said second chamber at a pressure greater than the steam pressure in the first chamber, controlling the pressure reduction to produce a predetermined pressure difference between the steam and water in said chambers, and thereafter heating the water in like manner at progressively higher pressures until the desired temperature is attained.

18. The method of heating water which consists in forcing it substantially continuously under pressure through an initial nozzle which converts pressure energy into energy of velocity, whereby the static pressure of the water is reduced, passing the water discharged from said nozzle at substantially constant pressure through a combining chamber and there heating it substantially to its evaporating temperature at the pressure within the chamber by condensing with it steam introduced into said chamber at a plurality of points distributed along the length of the chamber, increasing the pressure of the water by discharging it from said combining chamber through a passage which reconverts a portion of the energy of velocity into pressure energy, passing the water discharged from said passage at substantially constant pressure through a second combining chamber and there heating it substantially to its evaporating temperature at the augmented pressure within second chamber by condensing with it steam introduced into said chamber at a plurality of points distributed along the length of the chamber at a pressure greater than the steam pressure in the first chamber, and thereafter heating the water in like manner at progressively higher pressures until the desired temperature is obtained.

19. The method of heating water which consists in forcing it substantially continuously under pressure through an initial nozzle which converts pressure energy into energy of velocity, whereby the static pressure of the water is reduced, passing the water discharged from said nozzle at substantially constant pressure through a combining chamber, increasing the temperature and velocity of the water passing through said combining chamber by condensing with it steam introduced into said chamber at a plurality of points distributed along the length of the chamber, increasing the pressure of the water by discharging it from said combining chamber through a passage which reconverts a portion of the energy of velocity into pressure energy, discharging the water from said passage at substantially constant pressure through a second combining chamber, increasing the temperature and velocity of the water passing through said second combining chamber by condensing with it steam introduced into said second chamber at a plurality of points distributed along the length of the chamber, at a pressure higher than the steam pressure in the first chamber, and thereafter heating the water in like manner at progressively higher pressures until the desired temperature is obtained.

20. The method of heating water which consists in forcing it substantially continuously under pressure through an initial nozzle which converts pressure energy into energy of velocity, whereby the static pressure of the water is reduced, passing the water discharged from said nozzle at substantially constant pressure through a combining chamber, increasing the temperature and velocity of the water passing through said combining chamber by condensing with it steam introduced into said chamber, increasing the pressure of the water by discharging it from said combining chamber through a passage which reconverts a portion of the energy of velocity into pressure energy, discharging the water from said passage at substantially constant pressure through a second combining chamber, increasing the temperature and velocity of the water passing through said second combining chamber by condensing with it steam introduced into said second chamber at a pressure higher than the steam pressure in the first chamber, controlling the pressure reduction to produce a predetermined pressure difference between the steam and water in said chamber, and thereafter heating the water in like manner at progressively higher pressure until the desired temperature is obtained.

21. The method of heating water which consists in forcing it substantially continuously under pressure through an initial nozzle which converts pressure energy into energy of velocity, whereby the static pressure of the water is reduced, passing the water discharged from said nozzle at substantially constant pressure through a combining chamber, heating the water substantially to the evaporating temperature corresponding to the water pressure and increasing its velocity while it is passing through said chamber by condensing with it steam introduced into said chamber at a plurality of points distributed along the length of the chamber, increasing the pressure of the water by discharging it from said combining chamber through a passage which re-converts a portion of the energy of velocity into pressure energy, discharging the water from said passage at substantially constant pressure into a second combining chamber, heating the water to substantially the evaporating temperature corresponding to the augmented water pressure and increasing its velocity while it is passing through said chamber by condensing with it steam introduced into said second chamber at a plurality of points distributed along the length of the chamber at a pressure higher than the steam pressure in the first chamber, and thereafter heating the water in like manner at progressively higher pressures until the desired temperature is obtained.

22. The method of operating a steam power plant in accordance with the regenerative cycle which consists in evaporating a motive fluid under pressure in a generator, expanding said motive fluid in a prime mover, positively supplying said fluid to said generator under an initial positive pressure through a conduit, causing different fluid pressures to exist simultaneously in said conduit by progressively converting, due to said initial positive pressure, the pressure energy of said fluid into energy of velocity and vice versa as the fluid passes through said conduit, extracting a portion of the expanded fluid from a plurality of points of different pressure in said prime mover, and introducing the extracted fluid into said conduit at points where the pressure therein substantially corresponds to the pressure in said prime mover at the points of extraction.

23. In apparatus of the class described, the combination with a heater having a fluid passage therethrough, a steam chamber communicating with said passage, and means for varying the cross sectional area of said passage; of a mechanism for forcing fluid through said passage, and means automatically actuating said first named means to produce predetermined fluid pressures in said passage.

24. In apparatus of the class described, the combination with a heater comprising a plurality of serially connected heating stages having fluid passages therethrough of progressively larger cross sectional areas, a plurality of steam chambers each in communication with a different one of said passages, and means for varying said areas; of a mechanism for forcing fluid through said passages, and means automatically actuating said first named means to produce predetermined fluid pressures in said passages.

25. In apparatus of the class described, the combination with a heater having a fluid passage therethrough, a steam chamber communicating with said passage, and means for varying the cross-sectional area of said passage; of a mechanism for forcing fluid through said passage, and a regulating mechanism automatically actuating said means in response to variations in the pressure difference between said passage and said chamber.

26. In apparatus of the class described, the combination with a heater comprising a plurality of serially connected heating stages having fluid passages therethrough of progressively larger cross-sectional areas, a plurality of steam chambers each in communication with a different one of said passages, and means for varying said areas; of a mechanism for forcing fluid through said passages, and means for automatically actuating said first named means to maintain a constant pressure difference between each of said passages and its communicating chamber.

27. In apparatus of the class described, the combination with a housing forming a chamber in communication with a source of steam, of means forming an inwardly contracting water inlet and a water outlet, of means forming a symmetrical water space in alignment with said inlet and having a large surface area with respect to its volume, said space extending through said chamber to connect said inlet with said outlet and being in communication with said chamber at a plurality of points.

28. In apparatus of the class described, the combination with a housing forming a chamber in communication with a source of steam, of means forming an inwardly contracting water inlet and a water outlet, of means forming a water space having a large surface area with respect to its volume, said space extending through said chamber to connect said inlet with said outlet and being in communication with said chamber at a plurality of points, and means to vary the cross-sectional area of said water space.

29. In apparatus of the class described, the combination with a housing forming a chamber in communication with a source of steam, of means forming an inwardly contracting water inlet and a water outlet, of means forming a water space having a large surface area with respect to its volume, said space extending through said chamber to connect said inlet with said outlet and being in communication with said chamber at a plurality of points, and means to vary the cross-sectional area of said water space automatically to produce a predetermined water pressure therein.

30. In apparatus of the class described, the combination with a housing forming a chamber in communication with a source of steam, of means forming an inwardly contracting water inlet and a water outlet, of means forming a symmetrical annular water space in alignment with said inlet and extending through said chamber to connect said inlet with said outlet, said water space being in communication with said chamber at a plurality of points distributed along its length.

31. In apparatus of the class described, the combination with a housing forming a chamber in communication with a source of steam, said chamber having a water inlet and a water outlet, of a plurality of spaced annular rings located in said chamber in alignment between said inlet and said outlet and a plunger extending through said rings and spaced therefrom to form an annular water space extending through said chamber from the inlet to the outlet thereof.

32. In apparatus of the class described, the combination with a housing forming a chamber in communication with a source of steam, said chamber having a water inlet and a water outlet, of a plurality of spaced annular rings located in said chamber in alignment between said inlet and said outlet and with the inner surfaces of said rings forming a conical passage, a conical plunger extending through said rings and spaced therefrom to form an annular water space having a slightly increasing cross-sectional area from inlet to outlet, and means for moving said plunger longitudinally to vary the cross-sectional area of said water space.

33. In apparatus of the class described, the combination with a housing forming a chamber in communication with a source of steam, said chamber having a water inlet and a water outlet, of a plurality of spaced annular rings located in said chamber in alignment between said inlet and said outlet and with the inner surfaces of said rings forming a conical passage, a conical plunger extending through said rings and spaced therefrom to form an annular water space having a slightly increasing cross-sectional area from inlet to outlet, and automatic means responsive to the pressure difference existing between said chamber and water space for moving said plunger longitudinally to vary the cross-sectional area of said water space.

34. In apparatus of the class described, the combination with a housing forming a plurality of serially connected chambers each of which is in communication with a different source of steam, an inwardly contracting water inlet communicating with the first of said chambers, and a flaring outlet communicating with the last of said chambers, of a plurality of spaced annular nozzle-forming rings located in alignment in each of said chambers, the inner surface of said rings forming a conical passage through each of said chambers, conical plungers extending through the rings in each of said chambers to form conical annular water spaces therein, and means for independently adjusting the longitudinal position of said plungers.

35. In apparatus of the class described, the combination with a housing forming a plurality of serially connected chambers each of which is in communication with a different source of steam, an inwardly contracting water inlet communicating with the first of said chambers, and a flaring outlet communicating with the last of said chambers, of a plurality of spaced annular nozzle-forming rings located in alignment in each of said chambers, the inner surface of said rings forming a conical passage through each of said chambers, conical plungers extending through the rings in each of said chambers to form conical annular water spaces therein, and automatic means for independently adjusting said plungers to maintain predetermined pressures in said annular spaces.

36. In a power plant, the combination with an evaporator supplying motive fluid under pressure to a prime mover which expands said fluid to a lower pressure, of means for supplying heated fluid under pressure to said evaporator comprising a mechanical fluid-forcing mechanism, a conduit through which fluid is continuously delivered under pressure from said mechanism to said evaporator, said conduit having a portion of diminished cross-sectional area through which said fluid flows at increased velocity and substantially reduced pressure, a conduit supplying expanded fluid to said reduced pressure portion from a point in said prime mover at substantially the same pressure, and a non-return valve located in said last named conduit.

37. In a power plant the combination with an evaporator supplying motive fluid under pressure to a prime mover which expands said fluid to a substantially lower pressure, of means for supplying heated fluid to said evaporator under pressure comprising a mechanical fluid-forcing mechanism, a conduit through which fluid is delivered under pressure from said mechanism to said evaporator, said conduit having a portion of diminishing cross-sectional area followed by a portion of increasing cross-sectional area, whereby the fluid pressure therein is first reduced and then increased, and a plurality of conduits supplying expanded fluid to successively higher pressure points in said section of increasing area from corresponding pressure points in said prime mover, and a non-return valve in each of said last named conduits.

38. In the art of heating feed water, that improvement which consists in imparting to the feed water a substantial initial positive pressure, reducing said pressure by converting, due to the initial pressure, a portion of it to velocity energy, heating the water in its state of reduced pressure by exhaust steam at the lowest pressure utilized for heating the feed water and thereafter increasing the pressure of the feed water to at least the initial pressure by reconverting energy of velocity to pressure.

BENJAMIN N. BROIDO.